United States Patent [19]
Hughes

[11] Patent Number: 6,069,726
[45] Date of Patent: May 30, 2000

[54] OPTICAL SCANNER

[75] Inventor: John G. Hughes, Winter Park, Fla.

[73] Assignee: Lockheed Martin Corporation, Bethesda, Md.

[21] Appl. No.: 09/175,368

[22] Filed: Oct. 20, 1998

[51] Int. Cl.$^7$ .............................. G02B 26/08; H02P 8/00
[52] U.S. Cl. ........................ 359/223; 359/212; 359/226; 318/696
[58] Field of Search .................................. 359/212–214, 359/198–200, 223, 224, 872, 900; 318/696

[56] References Cited

U.S. PATENT DOCUMENTS

| | | |
|---|---|---|
| 4,285,566 | 8/1981 | Yamamoto . |
| 4,379,624 | 4/1983 | Miller et al. .............................. 350/486 |
| 4,595,870 | 6/1986 | Chitayat . |
| 4,710,691 | 12/1987 | Bergstrom et al. . |
| 4,837,433 | 6/1989 | Malinowski . |
| 4,904,917 | 2/1990 | Hakluytt . |
| 4,929,879 | 5/1990 | Wright et al. . |
| 5,009,473 | 4/1991 | Hunter et al. . |
| 5,225,756 | 7/1993 | Coutu . |
| 5,280,377 | 1/1994 | Chandler et al. . |
| 5,283,682 | 2/1994 | Ostaszewski . |
| 5,420,713 | 5/1995 | Kunii . |
| 5,436,753 | 7/1995 | Hayakawa . |
| 5,469,291 | 11/1995 | Plesko . |
| 5,521,740 | 5/1996 | Brosens . |
| 5,610,752 | 3/1997 | Hayakawa . |
| 5,617,241 | 4/1997 | Kitazawa . |
| 5,705,805 | 1/1998 | Han ...................................... 250/204.1 |

Primary Examiner—Cassandra Spyrou
Assistant Examiner—Fayez Assaf
Attorney, Agent, or Firm—Burns, Doane, Swecker & Mathis, LLP

[57] ABSTRACT

An optical scanner includes a support frame which rotatably supports a mirror. A stepper motor is provided for turning a cam which abuts the mirror. The motor imparts force to the mirror to define a scan profile when the cam is rotated. The scanner further includes a resilient member which applies force to the mirror, which, in turn, counteracts and cancels the force provided by the cam. Due to the cancellation of the force provided by the cam and the resilient member, no bending forces are applied to the mirror. The optical scanner further includes a control mechanism for applying sinusoidal currents to the stepper motor. More specifically, the control mechanism provides sine and cosine waveforms, and the control mechanism commutates the motor with the sine and cosine waveforms. The sine and cosine waveforms are pre-stored in a memory. In exemplary embodiments, the control mechanism provides constant velocity in one direction, and a fast retrace in an opposite direction. The control mechanism controls the motor without the use of feedback, thereby reducing the complexity and cost of the scanner.

13 Claims, 3 Drawing Sheets

OPTICAL SCANNER

BACKGROUND

1. Technical Field

The present invention relates to a high precision optical scanner which can be produced at relatively low cost for use in a wide variety of both military and civilian applications.

2. Discussion of Related Art

Optical scanner systems generally comprise a source of electromagnetic radiation, a reflective member and a detector. The source, such as a laser modulator, generates a beam of electromagnetic radiation which impinges upon the reflective member. The reflective member deflects the beam, typically toward some target object. The detector receives the deflected beam after it has made contact with the target object or objects. Movement of the reflective member, such as a mirror, defines a scan pattern of the optical scanning system.

There are many different techniques for implementing a desired scan pattern, although these techniques can be grouped into a few broad categories. A first well-known group of scanners are designed to operate in a resonant mode. These scanners are supported by a resilient member, such as a flexure or a spring. The resiliency of the spring and the shape and mass of the mirror define a natural frequency. If driven at this natural frequency, this type of scanner requires very little power.

In resonant scanning systems, the mirror typically vibrates back and forth about a neutral position and the angular displacement of the mirror follows a non-linear sinusoidal pattern. Hence, these scanners are typically used when bi-directional scanning is required. The non-linearity in the scan pattern and other limitations generally render this type of scanner ill-suited for applications where highly precise scanning is required.

A second variety of scanners do not necessarily rely on a natural resonant frequency of the mirror and spring structure. For instance, such a scanner may comprise a mirror which scans in a single direction, making complete rotations about a central axis of rotation. The mirror can have a single reflective face or plural reflective faces. Other scanners rotate about a central rotation axis, but only through a limited arc. This type of scanner can scan in two directions or a single direction. In the later category, the scanner may rotate the mirror at a prescribed constant velocity over an angular range of positions, and then the scanner quickly returns the mirror to its initial starting position to start another scan. This type of scanner is typically referred to as a scan-flyback or scan-retrace scanner.

Scan-flyback scanners are preferred in many military applications where a high degree of precision is required. Single-direction scanners are superior to bi-directional scanners because it is difficult to ensure constant revisit times throughout the image with bi-directional scanners. With bi-directional scanners, the end portions of the image are formed by readings that are collected close together in succession, but there is a relatively long time between consecutive pairs of such close readings, whereas the central part of the image is visited at a relatively constant rate. This variance in the revisit times at different positions along the range of the scan is undesirable from an image processing standpoint.

Both of the above-mentioned types of scanners typically employ a control mechanism which uses some type of feedback. For instance, the scanners may use a sensor which detects the location of the mirror, or some other position-related parameter. Signals from the sensor are input to the motor's controller as feedback, and corrective action is performed on the basis of these signals. The complexity of this feedback mechanism varies with the type of scanner and the scanner application (e.g., scanners which require highly precise scan profiles may require complex feedback mechanisms).

The design of an effective scanner presents a number of challenges. High precision in scanning is always desirable, and may be a mandatory design criterion in some applications. Generally, distortion produced in a scanning operation may be attributed to two basic sources: (a) the structural components of the scanner itself (e.g., the mirror, resilient components, mounting structure, etc.); and (b) the motor and motor control mechanism. For instance, with respect to the first source of errors, movement of the mirror may establish inertial forces which may cause aberrations in a desired scan profile. Also, the manner of applying force to the mirror may create forces within the mirror itself which cause distortions in the scan profile. For instance, some scanners apply force to the mirror at a first position on the mirror and provide a counteracting resilient force to the mirror at a spatially separate location on the mirror. This may be implemented by some type of piston or cam which contacts the mirror at the first location on the mirror, and a spring which contacts the mirror at the second location on the mirror. These opposing forces create bending within the mirror which distorts the desired scan pattern. These bending effects may be very small, but when high precision is required, these bending forces are enough to render the scanner ineffective.

With respect to the second source of errors, it is difficult to ensure a constant velocity in scanning with many conventional types of motors and motor controllers. As noted above, feedback mechanisms are prevalent in scanners, but feedback mechanisms are, by definition, reactive, and do not generally ensure error-free scanning. Also, the additional complexity of the feedback mechanism increases the potential of scanner failure.

The design of an effective scanner must also meet various non-technical criteria. Notably, it is desirable to produce the scanner at relatively low cost, especially in those scanners that are intended to be replaceable, or are intended to be used in low-price commercial merchandise, such as printers, display devices, and document scanners.

SUMMARY

It is therefore a general object of the invention to meet the dual demand of providing an optical scanner which offers high precision scanning, yet can be produced at relatively low cost.

These objects are satisfied by the present invention, which, according to exemplary embodiments, comprises an optical scanner including a support frame, a mirror rotatably fixed to the frame, a stepper motor, and a cam driven by the motor. The motor and cam impart force to the mirror to define a scan profile when the cam is rotated. The scanner further includes a resilient member for applying force to the mirror which counteracts and cancels the force supplied by the cam. Due to the cancellation of the forces provided by the cam and the spring, minimal bending forces are applied to the mirror, resulting in a scan profile which is subject to reduced distortion.

The optical scanner further includes a cam follower which is fixed to the mirror, wherein the cam follower is interposed between the mirror and the cam. The resilient member may comprise first and second springs which respectively straddle the cam. The springs are attached to the cam follower at respective first ends of the springs, and to the frame at respective second ends of the springs.

The optical scanner further includes a control mechanism for applying sinusoidal currents to the stepper motor. More specifically, the control mechanism provides sine and cosine waveforms, and the control mechanism commutates the motor with the sine and cosine waveforms. The sine and cosine waveforms can be pre-stored in a memory, e.g., in a look-up table.

In preferred embodiments, the control mechanism provides constant velocity scanning in one direction, and a fast retrace in an opposite direction, although is not limited to this type of scan profile. The control mechanism controls the motor without the use of feedback, thereby reducing the complexity and cost of the scanner.

BRIEF DESCRIPTION OF THE DRAWINGS

The above-mentioned exemplary objects and advantages of the invention will be understood by reading the following detailed description in conjunction with the drawings in which.

DETAILED DESCRIPTION

By way of overview, the scanner of the present invention is particularly well-suited for applications which demand high precision scanning, such as military applications employing laser scanning. For instance, the present invention can be used in military LADAR applications. Further, because the invention can also be produced at a relatively low cost, the scanner can be used in a wide variety of commercial applications, such as printers, photocopiers, display apparatus, documents scanners, barcode scanners, range finders, etc. The scanner can be used in conjunction with any type of electromagnetic radiation, such as infrared and visible range radiation.

Figure 1:
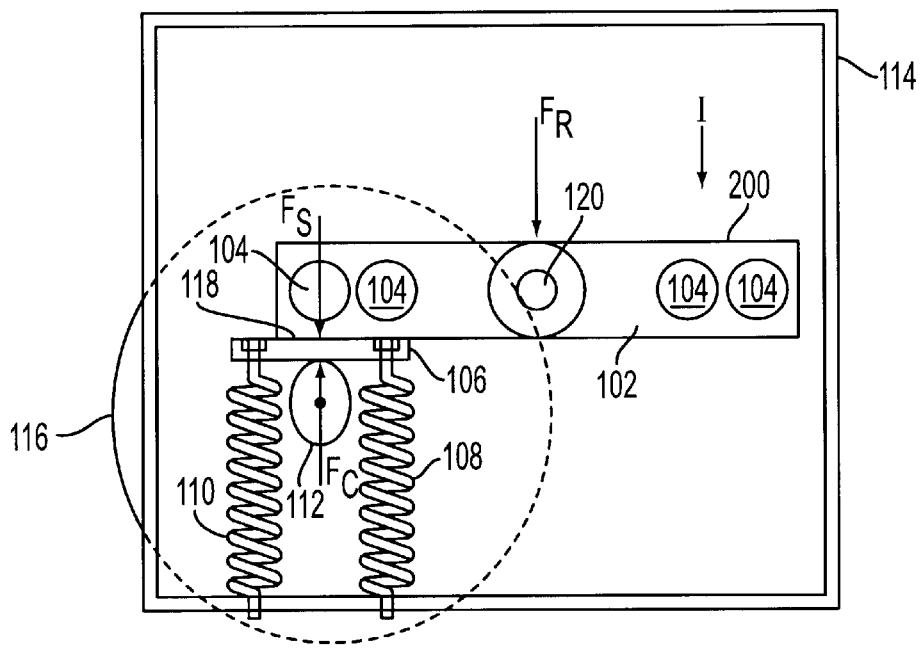
FIG. 1 shows the scanner system of the present invention according to one exemplary embodiment.
Figure 2:
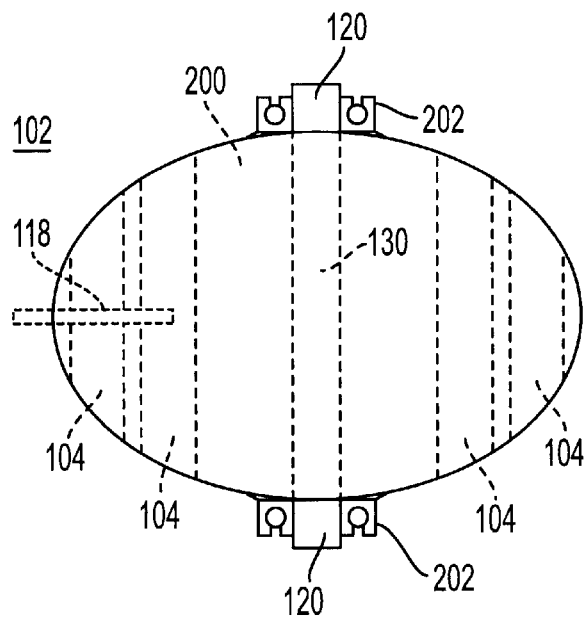
FIG. 2 shows a mirror used in the scanner system, viewing the mirror in the direction "I" shown in FIG. 1.

FIGS. 1 and 2 show two views of the scanner system 100 of the present invention. With reference to both of these figures, the system 100 includes a frame 114 which supports a mirror 102. The mirror 102 includes a central bore 130 through which a central rotation shaft 120 is inserted. The mirror 102 rotates about the central rotation shaft 120 with the assistance of annular members 202 located around the shaft 130 at the distal ends of the shaft 130. The annular members 202 include bearings disposed therein. Although not shown, the distal ends of the shaft 130 are rigidly fixed to the frame 114. Those skilled in the art will appreciate that other types of rotation mechanisms can be used. For instance, the mirror 102 can be rotatably supported by the frame using projections which extend from the mirror 102, but in this alternative embodiment, the projections do not pass through the body of the mirror 102 (e.g., a central rotation shaft is not employed).

In the exemplary embodiments shown in FIGS. 1 and 2, the mirror has an elliptical shape. However, other mirror geometries can be used, such as rectangular-shaped mirrors. In any event, it is desirable to reduce the size of the mirror to reduce its moment of inertia. To this end, a number of holes 104 are bored (or formed) in the mirror 102 to reduce its weight. Four holes have been bored in the exemplary embodiment shown, but a greater or fewer number of holes can be bored (including no holes). Accordingly to exemplary embodiments, a 1.5×1.0 inch elliptical mirror can be used, having an inertial moment of approximately 0.00013 in-oz-sec$^2$. The face 200 of the mirror 102 can comprise a reflective planar surface, such as provided by a silvered coating. In other embodiments, the mirror can have plural reflective faces, as well known in the art.

Rotational force is applied to the mirror 102 by a motor 116 via a cam 112 and cam follower 106. More specifically, the motor includes a rotation shaft (not shown) which is fixed to the cam 112. The outer edge of the cam 112 contacts the cam follower 106. The cam follower 106, in turn, is fixed to the mirror 102. The cam follower 106 may be fixed to the mirror 102 through some type of mechanical mechanism, or can be bonded to the mirror 102 using a suitable adhesive. The cam follower 106 includes a chisel point contour which contacts the mirror along a line 118. The location of the line 118 is not critical; it can be placed anywhere on the face of the mirror 102 so long as it is off-center with respect to the axis of rotation of the mirror 102. Further, the mirror 102 can include an appendage, such as an arm which extends out from the edge of the mirror 102, and the cam follower 106 can contact that appendage. In still another embodiment, the cam follower 106 can be dispensed with altogether; in this case, the cam 112 can contact the surface of the mirror directly.

The cam follower 106 is also attached to the frame 114 via one or more resilient members, such as springs 108 and 110. In the illustrated embodiment, the springs 108, 110 staddle the cam 112. Respective first ends of the springs 108, 110 are secured to the ends of the cam follower 106, and respective second ends of the springs 108, 110 are secured to the frame 114. In other embodiments, a single spring can be used which contacts the cam follower 106 in the same region where the cam 112 itself contacts the cam follower 106. In another embodiment, the spring(s) can be located on the opposite side of the mirror 102 as the cam 112. Regardless of the specific implementation, it is desirable that the springs 108, 110 and the cam 112 exert forces generally opposed to each other, as shown the figures. That is, the force provided by the springs ($F_S$) is applied to the same portion of the mirror 102 as the force provided by the cam ($F_C$), wherein the force $F_S$ is opposed to the force $F_C$. Hence, the forces ($F_S$ and $F_C$) substantially cancel each other. This means that forces are not applied within the mirror to any appreciable degree. This reduces bending in the mirror, which, in turn, reduces aberrations in scanning.

FIGS. 1 and 2 show that the mirror 112 can be rotated along a single axis (e.g., the axis along the shaft 120). Although not shown, the mirror 112 can be rotated about additional axes. For instance, the frame 114 itself can be rotated about an axis perpendicular to the shaft 120 axis. This can be accomplished using an additional set of springs and an additional cam and cam follower (or by some other rotation mechanism), wherein the additional cam follower contacts the frame 114 and moves the frame 114 in a direction which is orthogonal to the shaft 120 axis.

The shape of the cam 112 itself is application-specific. Different shaped cams provide different scan profiles, as well understood in the art.

Figure 3:
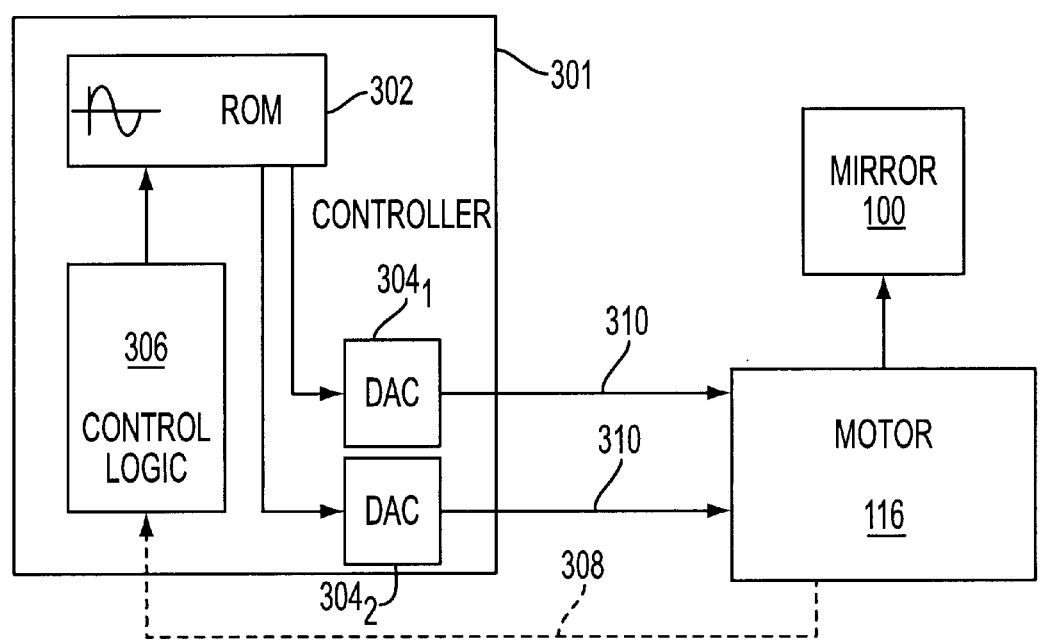
FIG. 3 shows a control mechanism which can be used in conjunction with the scanner system shown in FIG. 1.

The control mechanism 300 for the scanning system 100 is shown in FIG. 3. The control mechanism includes a controller 301, which includes, in one embodiment, a control logic unit 306, digital-to-analog-converters (DACs) 304₁ and 304₂, and a ROM 302. The control logic 106 can comprise a digital microprocessor governed by a set of stored microinstructions, or discrete logic circuitry (e.g, a digital state machine). The ROM 302 can alternatively comprise any type of preferably non-volatile memory, such as a PROM, or or some form of magnetic medium. The control mechanism 300 provides driving control signals to motor 116 via communication lines 310. Also, the control mechanism 300 optionally can receive feedback from the motor 116 via line (or lines) 308. In preferred embodiments, the motor 116 comprises a conventional stepper motor.

Digitized portions of sine and cosine waveforms are stored in ROM 302. For instance, the ROM 302 can store a quadrant of these sinusoidal waveforms. Alternatively, the ROM 302 can simply store the sine waveform, the cosine waveform being obtainable by phase offsetting of the sine waveform. These signals are accessed by the control logic 306, converted to analog values using the DACs 304₁ and 304₂, and then fed to the stepper motor 116 over lines 310 in commutated fashion, as well understood by those having skill in the art. DACs 304₁ and 304₂ can be used to separately convert the sine and cosine waveforms, respectively. Further details regarding the application of sine and cosine waveforms to a stepper motor to provide constant velocity scanning are described in U.S. Pat. No. 4,710,691, which patent is incorporated here by reference in its entirety.

By design, stepper motors provide a prescribed and well-defined amount of movement when a control pulse signal is applied thereto. By commutating the stepper motor sinusoidally, however, the motor behaves much like a more conventional non-stepping type of motor, providing very smooth operation with resultant constant velocity. Further, since the output of the stepper motor is more well-defined and predictable than other types of motors, the present invention need not employ sophisticated feedback and servo control mechanisms. Indeed, according to preferred embodiments, these feedback mechanisms are not used in the scanner of the present invention. This reduces the complexity and cost of the scanner. However, those skilled in the art will appreciate that feedback control can still be used in the present invention to further improve the accuracy of the scanning.

Due to the above-described mechanical and electrical attributes of the scanning system, the system consumes less power than some conventional scanning systems. For instance, the present scanning system can operate with 10 W of power, whereas some conventional scanning systems require 100 W of power.

Having set forth the structural and control mechanisms used in the invention, a specific exemplary embodiment will now be discussed.

Figure 4:
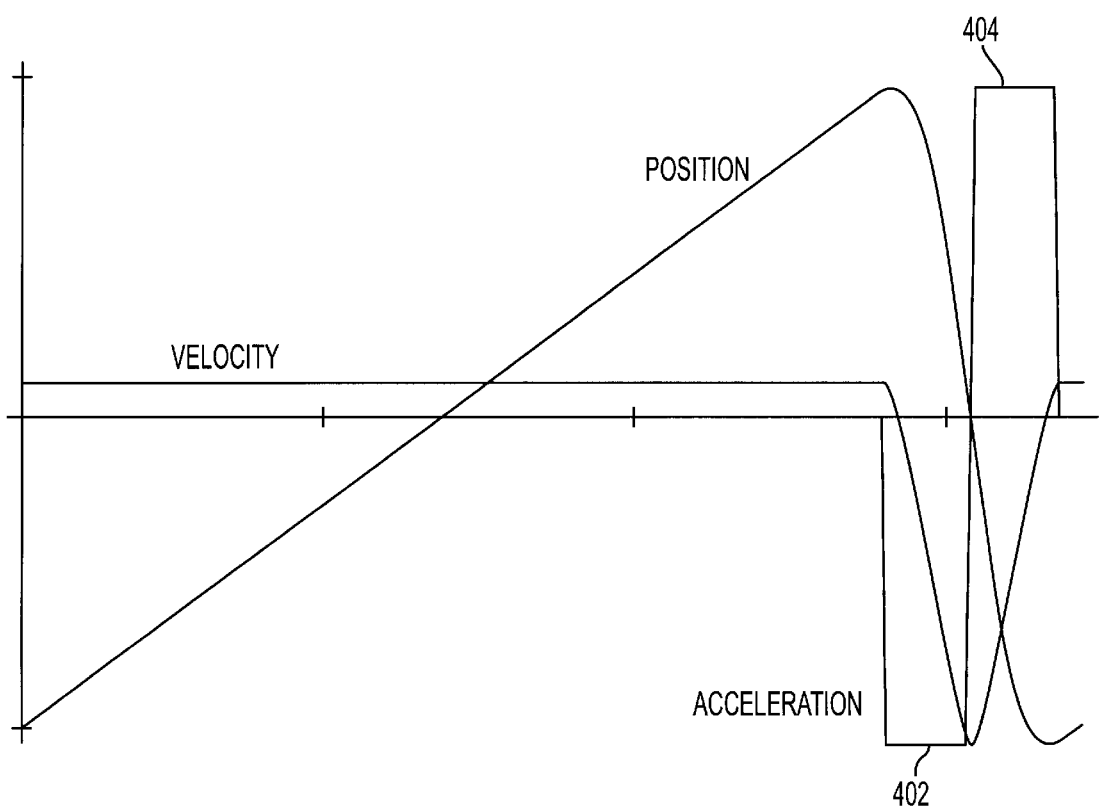
FIG. 4 shows overlapping plots of mirror position vs. time, mirror velocity vs. time, and mirror acceleration vs. time.

FIG. 4 shows exemplary position, velocity and acceleration profiles that can be provided with the present invention. Only one cycle is shown, although it should be noted that this same cycle profile is repeated many times in succession. During a first portion of the scan, the velocity remains constant (at velocity $V_0$) as the mirror 112 is swept over a prescribed angular swath (i.e., from scan starting angle $-r_1$ to scan ending angle r, respectively). Because the velocity is constant, the position of the mirror 112 advances at a linear rate from the initial position $-r_1$ at the starting endpoint angle to the other endpoint $r_1$ at the terminal endpoint angle of the scan. The positions $-r_1$ and $r_1$ are described here as being symmetric with respect to each other, but need not be so. The labels "starting" and "ending" are arbitrarily assigned to facilitate discussion.

When the mirror comes near the ending angle $r_1$, the scan is completed, and it is necessary to move the mirror to its starting position $-r_1$. To accomplish this, two acceleration pulses are used, as shown in FIG. 4. The first acceleration pulse 402 pulls the mirror in the opposite direction from which it is currently moving at constant speed, causing the motor to advance back toward its starting position $-r_1$. The second acceleration pulse 404 is opposite to the direction of the first acceleration pulse 402, and sets the mirror rotating once again in its main scan direction. Constant acceleration is shown in the figures. However, other acceleration and velocity profiles can be used depending on the application.

The controller 301 thereby performs scanning in the flyback mode of operation. Alternatively, bi-directional scanning can be performed. The portions of the scan profile where the mirror 102 reverses direction are referred to herein as "turn around."

Assume, for the purpose of illustration, that a 100 Hz scanning cycle is used with a 75% scan profile. This means that 0.0075 seconds of every scan cycle are used for actual scanning at constant velocity in a main scan direction. The velocity plateau shown in FIG. 4 indicates the portion of the cycle used for scanning at a constant velocity Vo in the main scanning direction. Assuming that $-r_1$ and $r_1$ have the exemplary values of $-0.0873$ rad and $0.0873$ rad, respectively, the total angular swath (i.e., the total travel) is $2*0.0873$ rad, and the velocity $V_0$ is $2*0.0873$ rad/0.0075 sec=23.271 rad/sec. The remaining 0.0025 seconds in the scan cycle are used for the fast retrace. In the fast retrace, the two acceleration pulses 402, 404 are used, each of which has a width of 0.0025/2=0.00125.

The acceleration A of each pulse can be computed according to the equation:

$$S_t = S_0 + V_0 * t + 0.5 * A * t^2$$

where:

$S_t$=the instantaneous mirror position vs. time (i.e., $S_t$=0 at the end of one acceleration pulse);

$S_0$=the mirror position just prior to the start of turn around (i.e., $S_0$=0.873 rad);

$V_0$=mirror initial velocity (i.e., $V_0$=−23.271 rad/sec);

A=the required acceleration; and t=time (i.e., t=0.00125 sec, which is the width of one acceleration pulse).

Solving for A by substituting the known values results in a required acceleration A of 149,000 rad/sec².

Having calculating the value of the required acceleration A, it is possible to calculate the torque of the mirror during turn around. The required net torque is:

$$T = I * A$$

where:

T=the required net torque;

I=the moment of inertia (i.e., I=0.00013 in-oz-sec²);

A=the required acceleration (i.e., A=149,000 rad/sec²).

Solving for T by substituting the known values results in T=19.4 in-oz.

For half of the turn around, the accelerating force ($F_S$) comes from only the springs. In the present illustrative example, the spring is located 0.625 inches from the center of rotation of the mirror. The required force from the spring therefore is:

$$F_S = T/r$$
$$= 19.4 \text{ in-oz}/0.625 \text{ in}$$
$$= 31.0 \text{ oz.}$$

To ensure cam following, the spring force should be slightly greater than required for turn around; in this case, nominally 36 oz. of spring force will suffice. During the other half-cycle of turn around, the net torque to the mirror must now be 19.4 in-oz., in the opposite direction. The total torque delivered by the cam is therefore:

$$T_{cam} = T_{acc} + T_{spring}$$
$$= 19.4 \text{ in-oz} + (36 \text{ oz.} * 0.625 \text{ in})$$
$$= 49.9 \text{ in-oz}$$

The force delivered by the cam is:

$$F_C = 41.9 \text{ in-oz}/0.625 \text{ in}$$
$$= 67 \text{ oz.}$$

As described above, the total radial force ($F_r$) reacted by the bearing is very nearly zero during linear scan because of localized force cancellation of $F_S$ and $F_C$. During turn around, $F_r$ is equal to the couple that exists due to the accelerating force at one end of the mirror.

It is believed that the scan linearity will be dominated by imperfections in the cam profile, not the stepper motor velocity linearity. A cam profile error of 0.0005 inches will result in a scan velocity of one percent.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. An optical scanner, comprising:
   a support frame;
   a mirror rotatably fixed to said frame;
   a stepper motor;
   a cam follower which is affixed to said mirror;
   a cam driven by said motor, which imparts force to said cam follower to define a scan profile when said cam is rotated;
   a resilient member applying force directly to said cam follower which counteracts said force provided by said cam; and
   a control mechanism for applying sinusoidal currents to said stepper motor.

2. The optical scanner of claim 1, wherein said cam follower is interposed between said mirror and cam.

3. An optical scanner, comprising:
   a support frame;
   a mirror rotatably fixed to said frame;
   a stepper motor;
   a cam driven by said motor, which imparts force to said motor to define a scan profile when said cam is rotated;
   a resilient member applying force to said mirror which counteracts said force provided by said cam, wherein said resilient member comprises first and second springs which straddle said cam; and
   a control mechanism for applying sinusoidal currents to said stepper motor.

4. The optical scanner of claim 2, wherein said resilient member comprises a first and second springs which respectively straddle said cam.

5. The optical scanner of claim 4, wherein said first and second springs are attached at respective first ends to said cam follower and at respective second ends to said frame.

6. The optical scanner of claim 1, wherein said mirror includes a plurality of holes formed therein to reduce the inertia of said mirror.

7. The optical scanner of claim 1, wherein said mirror includes a central shaft, and said mirror is rotatable about said shaft.

8. The optical scanner of claim 1, wherein said mirror has an elliptical shape.

9. The optical scanner of claim 1, wherein said control mechanism provides sine and cosine waveforms, and said control mechanism commutates said motor with said sine and cosine waveforms.

10. The optical scanner of claim 9, wherein said sine and cosine waveforms are pre-stored in a memory.

11. The optical scanner of claim 1, wherein said control mechanism provides constant velocity in one direction, and a fast retrace in an opposite direction.

12. The optical scanner of claim 1, wherein said control mechanism controls said motor without the use of feedback.

13. A method for optically scanning, comprising the steps of:
   applying sinusoidal currents to a stepper motor to drive a cam;
   applying force, via said cam, to a cam follower wherein said cam follower is connected to a mirror;
   applying force, by a resilient member, directly to said cam follower, said force applied by said resilient member counteracting said force applied by said cam; and
   rotating said mirror in response to movement of said cam.

* * * * *